United States Patent
Kurita et al.

(10) Patent No.: US 9,346,372 B2
(45) Date of Patent: May 24, 2016

(54) SHIFT CONTROL DEVICE FOR ELECTRIC VEHICLE

(71) Applicant: Nissan Motor Co., Ltd., Yokohama-shi, Kanagawa (JP)

(72) Inventors: Takashi Kurita, Isehara (JP); Atsushi Tsukizaki, Ebina (JP); Ryohey Toyota, Isehara (JP); Toshifumi Hibi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/647,344

(22) PCT Filed: Nov. 21, 2013

(86) PCT No.: PCT/JP2013/081364
§ 371 (c)(1),
(2) Date: May 26, 2015

(87) PCT Pub. No.: WO2014/103572
PCT Pub. Date: Jul. 3, 2014

(65) Prior Publication Data
US 2015/0298576 A1    Oct. 22, 2015

(30) Foreign Application Priority Data

Dec. 26, 2012   (JP) .................. 2012-282379

(51) Int. Cl.
| G06F 7/00 | (2006.01) |
| B60L 15/20 | (2006.01) |
| B60T 7/12 | (2006.01) |
| F16H 59/08 | (2006.01) |
| F16H 61/02 | (2006.01) |
| F16H 63/50 | (2006.01) |
| B60L 1/00 | (2006.01) |

(52) U.S. Cl.
CPC ............ *B60L 15/2054* (2013.01); *B60L 1/003* (2013.01); *B60L 15/2009* (2013.01); *B60L 15/2018* (2013.01); *B60T 7/12* (2013.01); *F16H 59/08* (2013.01); *F16H 61/02* (2013.01); *F16H 63/50* (2013.01); *B60L 2240/12* (2013.01); *B60L 2240/421* (2013.01); *B60L 2240/423* (2013.01); *B60L 2240/486* (2013.01); *B60L 2240/80* (2013.01); *B60L 2250/26* (2013.01); *Y02T 10/645* (2013.01); *Y02T 10/7275* (2013.01)

(58) Field of Classification Search
None
See application file for complete search history.

(56) References Cited

U.S. PATENT DOCUMENTS

| 2004/0045750 A1 | 3/2004 | Baraszu et al. |
| 2004/0065490 A1 | 4/2004 | Saito et al. |
| 2008/0188346 A1 | 8/2008 | Sugai et al. |

FOREIGN PATENT DOCUMENTS

| CN | 101209682 A | 7/2008 |
| CN | 101311015 A | 11/2008 |
| JP | 6-245329 A | 9/1994 |
| JP | 7-174218 A | 7/1995 |
| JP | 2009-77585 A | 4/2009 |
| JP | 2010-252526 A | 11/2010 |

*Primary Examiner* — Thomas Tarcza
*Assistant Examiner* — Garrett Evans
(74) *Attorney, Agent, or Firm* — Global IP Counselors, LLP

(57) ABSTRACT

A gear shifting control device is provided with a driving motor-generator, an automatic transmission provided in a drivetrain and a gear shifting controller. The automatic transmission has a P range, an N range and a D range as selectable range positions. The gear shifting controller changes the gears in the automatic transmission. The gear shifting controller sets the N range of the automatic transmission to be a range over which the driving motor-generator is not caused to generate torque even when a operation for depressing an accelerator pedal has been performed, and places a coupling clutch in an engaged state in first gear when the N range is selected.

14 Claims, 8 Drawing Sheets

| STATE | 1st GEAR ENGAGING ELEMENT | 2nd GEAR ENGAGING ELEMENT | PARK MECHANISM | REMARKS |
|---|---|---|---|---|
| NON-TRAVEL RANGE | DISENGAGED | DISENGAGED | ON | TIRES UNCOUPLED FROM MOTOR |
| NEUTRAL RANGE | ENGAGED | DISENGAGED | OFF | MOTOR ACTUATION PROHIBITED |
| TRAVEL RANGE | ENGAGED | DISENGAGED | OFF | |

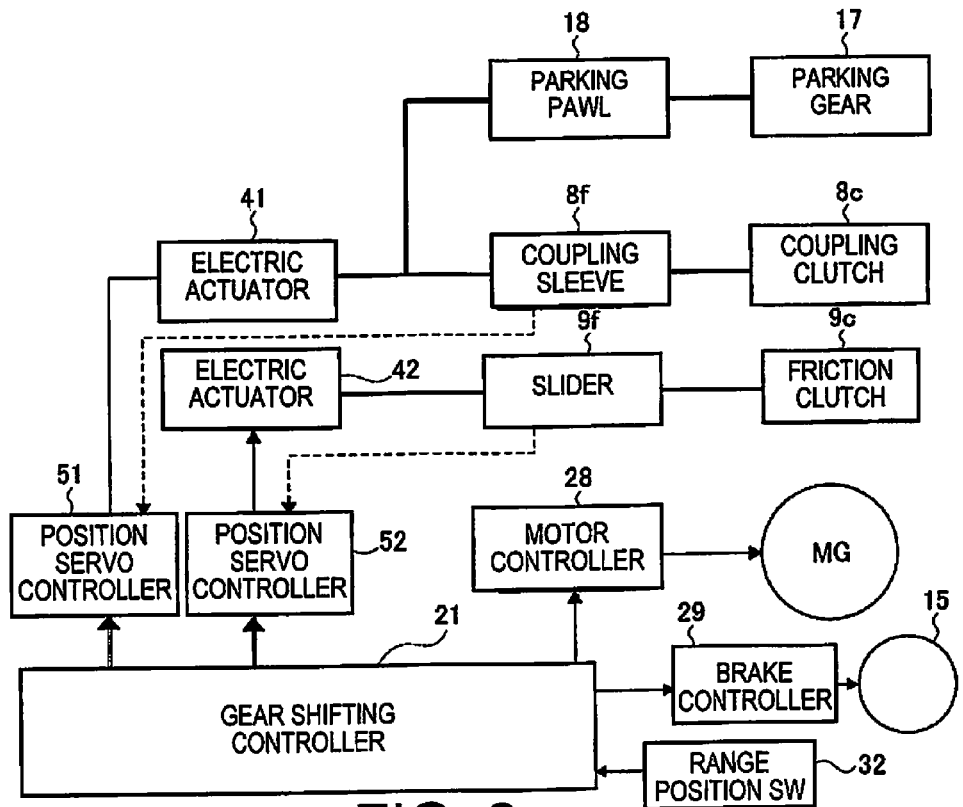

SHIFT CONTROL DEVICE FOR ELECTRIC VEHICLE

CROSS-REFERENCE TO RELATED APPLICATIONS

This application is a U.S. National stage application of International Application No. PCT/JP2013/081364, filed Nov. 21, 2013, which claims priority to Japanese Patent Application No. 2012-282379 filed in Japan on Dec. 26, 2012. The entire disclosure of the Japanese Patent Application No. 2012-282379 is hereby incorporated herein by reference.

BACKGROUND

1. Field of the Invention

The present invention relates to a device for changing gear in an electric vehicle in which a stepped transmission having a park range, a neutral range and a travel range as selectable range positions is provided in a drivetrain extending from an electric motor to drive wheels.

2. Background Information

There are known in the prior art devices that facilitate selecting the start-off gear in an electric automobile where, when it is impossible to manually shift to a start-off gear due to the gear teeth colliding, etc., an electric motor is momentarily driven, the colliding, etc. of the gear teeth is eliminated, and shifting can be performed (e.g., refer to Japanese Laid-Open Patent Application No. 6-245329).

SUMMARY

However, in conventional electric automobiles, when, upon starting off, a transition from a neutral state to the first forward gear or reverse start-off gear has been selected, a hydraulic-pressure-generating pump will also be stopped when the vehicle is stopped, because the electric motor is stopped. This presents a problem in that the start-off gear cannot be selected prior to a start-off operation in which the accelerator pedal is depressed and the electric motor is started up, and start-off off delays are inevitable due poor response when a selection to transition from neutral range to a travel range is made.

In particular, the electric automobile disclosed in Japanese Laid-Open Patent Application No. 6-245329 has a coupling clutch that meshingly engages a first-gear-engaging element of the transmission. Accordingly, when an operation transitioning from the neutral-range to the travel range is to be selected, time will elapse between when meshed engagement of the coupling clutch starts and ends, and the coupling clutch may not consistently transition to a meshed state in certain meshing positions.

In view of the above problem, it is an object of the present invention to provide a device for changing gear in an electric vehicle in which, when an operation for transitioning from the neutral range to the travel range is to be selected, a response can be made to a rapid start-off request.

In order to achieve the above-stated object, the present invention comprises: an electric motor provided as a drive source; a stepped transmission provided in a drivetrain extending from the electric motor to drive wheels, the stepped transmission having a park range, a neutral range, and travel ranges as selectable range positions; and gear shifting control means for controlling gear shifting in the stepped transmission. In the device for changing gear in an electric vehicle, the gear shifting control means sets the neutral range of the stepped transmission to a range over which the electric motor is not caused to generate torque even when an accelerator-depressing operation has been performed, and places a first-gear-engaging element in an engaged state to engage first gear when the neutral range has been selected.

Consequently, the first-gear-engaging element to be engaged in first gear is set in an engaged state when neutral range is selected. At this time, having the neutral range of the stepped transmission set to a range over which the electric motor is not caused to generate torque when an accelerator-depressing operation has been performed allows the engaging of the first-gear-engaging element when the neutral range has been selected. In other words, the start-off response may be delayed when the engagement of the first-gear-engaging element is started after the travel range has been selected. By contrast, when the travel range is selected for starting off, it is possible to prepare for starting off in first gear by depressing the accelerator in the travel range by placing the first-gear-engaging element in an engaged state in advance in the neutral range, which has been passed through or selected prior to selection of the travel range. As a result, it is possible to respond to a request for a rapid start-off when an operation for selecting transitioning to a travel range from a neutral range.

BRIEF DESCRIPTION OF THE DRAWINGS

Referring now to the attached drawings which form a part of this original disclosure.

FIG. 2 is a control block view showing a detailed configuration of the system of gear shifting control in Embodiment 1 using motor/neutral cooperative control.

FIG. 3 is a chart showing an action table of the first-gear-engaging element, the second engaging element, and the park mechanism in the non-travel range, neutral range, and travel range during start-off in first gear on a flat road.

FIG. 4 is a chart showing an action table of the first-gear-engaging element, the second-gear-engaging element, and the park mechanism in the non-travel range, neutral range, and travel range during start-off in second gear on a flat road.

DETAILED DESCRIPTION OF THE EMBODIMENTS

Figure 1:
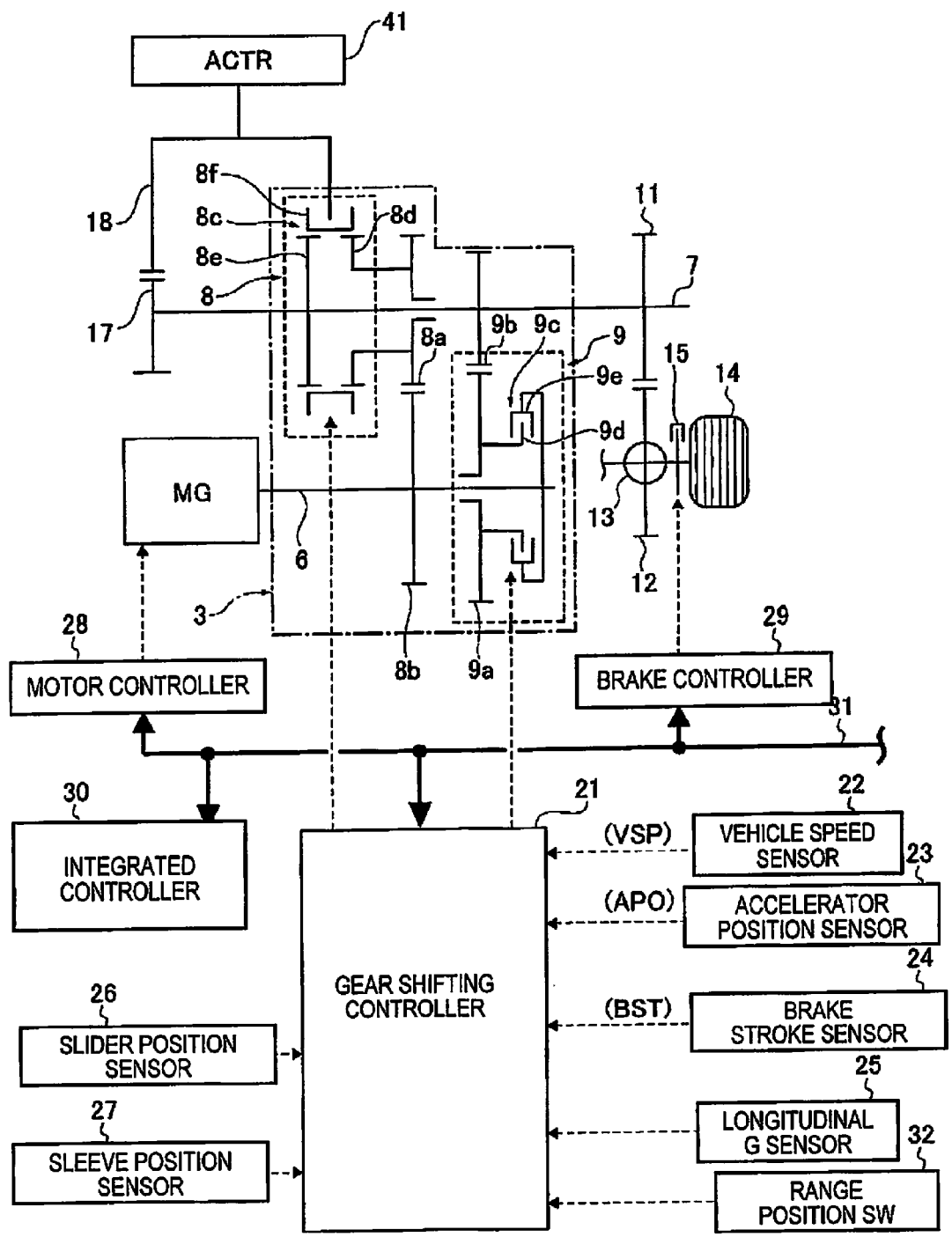
FIG. 1 is an overall schematic system configuration diagram showing the drivetrain configuration and the control system configuration in an electric automobile (one example of an electric vehicle) in which the gear shifting control device of Embodiment 1 has been applied.

A preferred embodiment of the device for changing gear in an electric vehicle of the present invention is described below based on Embodiment 1 shown in the drawings.

Embodiment 1

First, the configuration of the embodiment will be described. The configuration of a gear shifting control device mounted in an electric vehicle in Embodiment 1 (an example of a gear shifting control device) is described below under the headings: "Overall system configuration," "Detailed configuration of gear shifting control system," and "Gear shifting control process configuration."

Overall System Configuration

FIG. 1 shows the drivetrain configuration and the control system configuration of an electric automobile in which the gear shifting control device of Embodiment 1 has been applied. The overall system configuration is described below with reference to FIG. 1.

The drivetrain configuration of the electric automobile is provided with a drive motor generator MG (electric motor), an automatic transmission 3 (stepped transmission), and drive wheels 14, as shown in FIG. 1.

The drive motor generator MG is mainly used as a drive motor, and a motor shaft thereof is connected to a transmission input shaft 6 of the automatic transmission 3.

The automatic transmission 3 is a constant-meshing stepped transmission in which power is transmitted by two gear pairs having different gearing ratios, and uses dual-level shifting having a high gear stage (high speed gear) with a small reduction gear ratio, and a low gear stage (low speed gear) with a large reduction gear ratio. The automatic transmission 3 is used for shifting when motor power is outputted from the drive motor generator MG in sequence via the transmission input shaft 6 and a transmission output shaft 7, and is composed of a low-side shift mechanism 8 for implementing a low speed stage and a high-side shift mechanism 9 for implementing the high speed stage. In this case, the transmission input shaft 6 and the transmission output shaft 7 are arranged parallel to each other.

The low-side shift mechanism 8 is used for selecting a low-side power transmission path when the motor power is to be outputted, and is arranged above the transmission output shaft 7. The low-side shift mechanism 8 is composed of a coupling clutch 8c (first-gear-engaging element) for meshing/unmeshing a gear 8a relative to the transmission output shaft 7 so that a low speed stage gear pair (gear 8a, gear 8b) drivably links the transmission input/output shafts 6, 7. Here, the low speed stage gear pair is composed of a gear 8a rotatably supported on the transmission output shaft 7, and a gear 8b that meshes with the gear 8a and rotates in concert with the transmission input shaft 6.

The high-side shift mechanism 9 is used for selecting a high-side transmission path when the motor power is to be outputted, and is arranged above the transmission input shaft 6. The high-side shift mechanism 9 is composed of a friction clutch 9c (second-gear engaging element) for frictionally engaging/disengaging a gear 9a relative to the transmission input shaft 6 so that a high speed stage gear pair (gear 9a, gear 9b) drivably links the transmission input/output shafts 6, 7. In this case, the high speed stage gear pair is composed of a gear 9a rotatably supported on the transmission input shaft 6, and a gear 9b that meshes with the gear 9a and rotates in concert with the transmission output shaft 7.

The transmission output shaft 7 has a gear 11 secured thereto, the transmission output shaft drive-coupling a differential gear device 13 to the transmission output shaft 7 via a final drive gear set comprising the gear 11 and a gear 12 that meshes therewith. The motor power of the drive motor generator MG which has arrived at the transmission output shaft 7 is thereby transmitted to the left and right drive wheels 14 (FIG. 1 shows only one of the drive wheels) via the final drive gear set 11, 12 and the differential gear device 13. A parking gear 17 is secured to the transmission output shaft 7 on the side opposite the gear 11, and a parking pawl 18 provided to the transmission case (not shown) is arranged so as to be capable of meshing with the parking gear 17. In other words, the parking pawl 18 is caused by the coupling clutch 8c and a dual-use electric actuator 41 to mesh with the parking gear 17, and is thereby secured to the case so that the transmission output shaft 7 does not rotate when the P range position is selected.

The control system configuration of the electric automobile comprises a gear shifting controller 21, a vehicle speed sensor 22, an accelerator position sensor 23, a brake stroke sensor 24, a longitudinal G sensor 25, a slider position sensor 26, and a sleeve position sensor 27, as well as other components, as shown in FIG. 1. Additionally provided are a motor controller 28, a brake controller 29, an integrated controller 30, a controller area network (CAN) communication line 31 and a range position switch 32.

When shifting up to the high gear stage with the low gear stage in which the coupling clutch 8c is meshingly coupled and the friction clutch 9c is disengaged having been selected, the gear shifting controller 21 implements reengagement control by uncoupling the coupling clutch 8c and frictionally engaging the friction clutch 9c. When shifting down to the low gear stage with the high gear stage in which the coupling clutch 8c is uncoupled and the friction clutch 9c is frictionally engaged having been selected, the gear shifting controller 21 implements reengagement control by meshingly coupling the coupling clutch 8c and disengaging the friction clutch 9c.

The range position switch 32 detects the range position of the automatic transmission 3 selected by a selection operation of the driver using the select lever (not shown). The detected range positions include a P range (parking range, non-travel range, park range), N range (neutral range), D range (drive range, forward travel range), and R range (reverse range, rearward travel range).

Detailed Configuration of Gear Shifting Control System

FIG. 2 shows a detailed configuration of the gear shifting control system of Embodiment 1. FIG. 3 shows an action table of the range positions during start-off in first gear on a flat road. FIG. 4 shows an action table of the range positions during start-off in second gear on a flat road. The detailed configuration of the gear shifting control system is described below with reference to FIGS. 2 to 4.

The gear shifting control system in the control system of the electric automobile comprises the coupling clutch 8c, the friction clutch 9c, the parking gear 17, the drive motor generator MG, a hydraulic brake 15, and the gear shifting controller 21, as shown in FIG. 2. In other words, the coupling clutch 8*c*, the friction clutch 9*c*, the drive motor generator MG, and the hydraulic brake 15 are controlled components and are configured to be controlled by commands from the gear shifting controller 21 in accordance with certain conditions.

The coupling clutch 8*c* is a clutch that couples via synchromeshing, the coupling clutch 8*c* having a clutch gear 8*d* provided to the gear 8*a*, a clutch hub 8*e* linked to the transmission output shaft 7, and a coupling sleeve 8*f* (see FIG. 1). The coupling sleeve 8*f* is stroke-driven by the electric actuator 41 to performing meshed coupling and uncoupling. The meshed coupling and uncoupling of the coupling clutch 8*c* is determined by the position of the coupling sleeve 8*f*, and the gear shifting controller 21 is provided with a position servo controller 51 (e.g., a position servo system by PID control) that reads the value of the sleeve position sensor 27 and imparts an electric current to the electric actuator 41 so that the sleeve position is set to be the meshing and coupling position or the uncoupled position. The gear 8*a* is drive-connected to the transmission output shaft 7 when the coupling sleeve 8*f* is in the meshing position shown in FIG. 1, coupled with the external peripheral clutch teeth of both the clutch hub 8*e* and the clutch gear 8*d*. The coupling sleeve 8*f* is displaced from the position shown in FIG. 1 in the axial direction to separate the gear 8*a* from the transmission output shaft 7 when the coupling sleeve is in a non-meshing position with either of the clutch gear 8*d* or the clutch hub 8*e*.

The friction clutch 9*c* has a driven plate 9*d* that rotates in concert with the clutch gear 9*a*, and a drive plate 9*e* that rotates in concert with the transmission input shaft 6 (see FIG. 1). A slider 9*f* for imparting a pressing force on the plates 9*d*, 9*e* is driven by an electric actuator 42 to frictionally engage/disengage the friction clutch. The transmitted torque capacity of the friction clutch 9*c* is determined by the position of the slider 9*f*. The slider 9*f* is a threaded mechanism and configured to hold a position when the input of the electric actuator 42 is 0 (zero). The gear shifting controller 21 is provided with a position servo controller 52 (e.g., a position servo system by PID control) that reads the value of the slider position sensor 26 and imparts an electric current to the electric actuator 42 so as to set a slider position at which a desired transmitted torque capacity can be obtained. The friction clutch 9*c* integrally rotates with the transmission input shaft 6, drive-connects the gear 9*a* to the transmission input shaft 6 when the clutch frictionally engages, and separates the drive-connection between the gear 9*a* and the transmission input shaft 6 when the clutch disengages.

The parking pawl 18 is caused by the coupling clutch 8*c* and electric actuator 41 to mesh with the parking gear 17 when the P range position (non-travel range position) is selected, whereby the parking gear is secured to the case so that the transmission output shaft 7 does not rotate. In other words, the electric actuator 41 manages action in three positions: the meshing position with the coupling clutch 8*c*, the non-meshing position with the coupling clutch 8*c*, and the meshing position of the parking gear 17.

The drive motor generator MG is torque-controlled or speed-controlled by the motor controller 28, into which a command outputted by the gear shifting controller 21 is inputted. In other words, when a torque capacity command, a torque upper limit value command, or an input/output rotation synchronization command is inputted to the motor controller 28 from the gear shifting controller 21, the drive motor generator MG is torque-controlled or speed-controlled on the basis of these commands.

Popup actuation for increasing the brake engagement force of the hydraulic brake 15 is controlled by a brake hydraulic actuator (not shown) that receives a drive command from the brake controller 29 for inputting a command outputted from the gear shifting controller 21.

The gear shifting controller 21 performs action control in range positions during start-off in first gear on a flat road (FIG. 3), and action control in range positions during start-off in second gear on a flat road (FIG. 4), on the basis of range position information acquired from the range position switch 32. The action control in the range positions of FIGS. 3 and 4 is described below.

The action control in the range positions during start-off in first gear on a flat road is divided into a non-travel range (P range), neutral range (N range), and travel ranges (D range, R range), as shown in FIG. 3.

In the non-travel range, the coupling clutch 8*c* (first-gear-engaging element) is uncoupled, the friction clutch 9*c* (second-gear-engaging element) is disengaged, and the parking pawl 18 is caused to mesh with the parking gear 17 to engage the park mechanism. In other words, the tires of the drive wheels 14 and the drive motor generator MG are not coupled.

In the neutral range, the coupling clutch 8*c* (first-gear-engaging element) is engaged, the friction clutch 9*c* (second-gear-engaging element) is disengaged, and the parking pawl 18 is unmeshed from the parking gear 17 to disengage the parking mechanism. In the neutral range, the drive motor generator MG is not caused to generate torque even when an accelerator operation is performed. In other words, torque transmission via the low-side transmission path is placed in a standby state.

In the travel range, the coupling clutch 8*c* (first-gear-engaging element) is engaged subsequent to the neutral range, the friction clutch 9*c* (second-gear-engaging element) is disengaged, and the parking pawl 18 is unmeshed from the parking gear 17 to disengage the parking mechanism. In other words, torque generated by the drive motor generator MG is transmitted to the tires of the drive wheels 14 via the low-side transmission path.

The action control in the range positions during start-off in second gear on a flat road area divided into a non-travel range (P range), neutral range (N range), and travel ranges (D range, R range), as shown in FIG. 4.

In the non-travel range, the coupling clutch 8*c* (first-gear-engaging element) is uncoupled, the friction clutch 9*c* (second-gear-engaging element) is disengaged, and the parking pawl 18 is caused to mesh with the parking gear 17 to engage the park mechanism. In other words, the tires of the drive wheels 14 and the drive motor generator MG are not coupled.

In the neutral range, the coupling clutch 8*c* (first-gear-engaging element) is uncoupled, the friction clutch 9*c* (second-gear-engaging element) is engaged, and the parking pawl 18 is unmeshed from the parking gear 17 to disengage the parking mechanism. In the neutral range, the drive motor generator MG is not caused to generate torque even when an accelerator operation is performed. In other words, torque transmission via the high-side transmission path is placed in a standby state.

In the travel range, the coupling clutch 8*c* (first-gear-engaging element) is uncoupled subsequent to the neutral range, the friction clutch 9*c* (second-gear-engaging element) is engaged, and the parking pawl 18 is unmeshed from the parking gear 17 to disengage the parking mechanism. In other words, torque generated in the drive motor generator MG is transmitted to the tires of the drive wheels 14 via the high-side transmission path.

Gear Shifting Control Process Configuration

Figure 5:
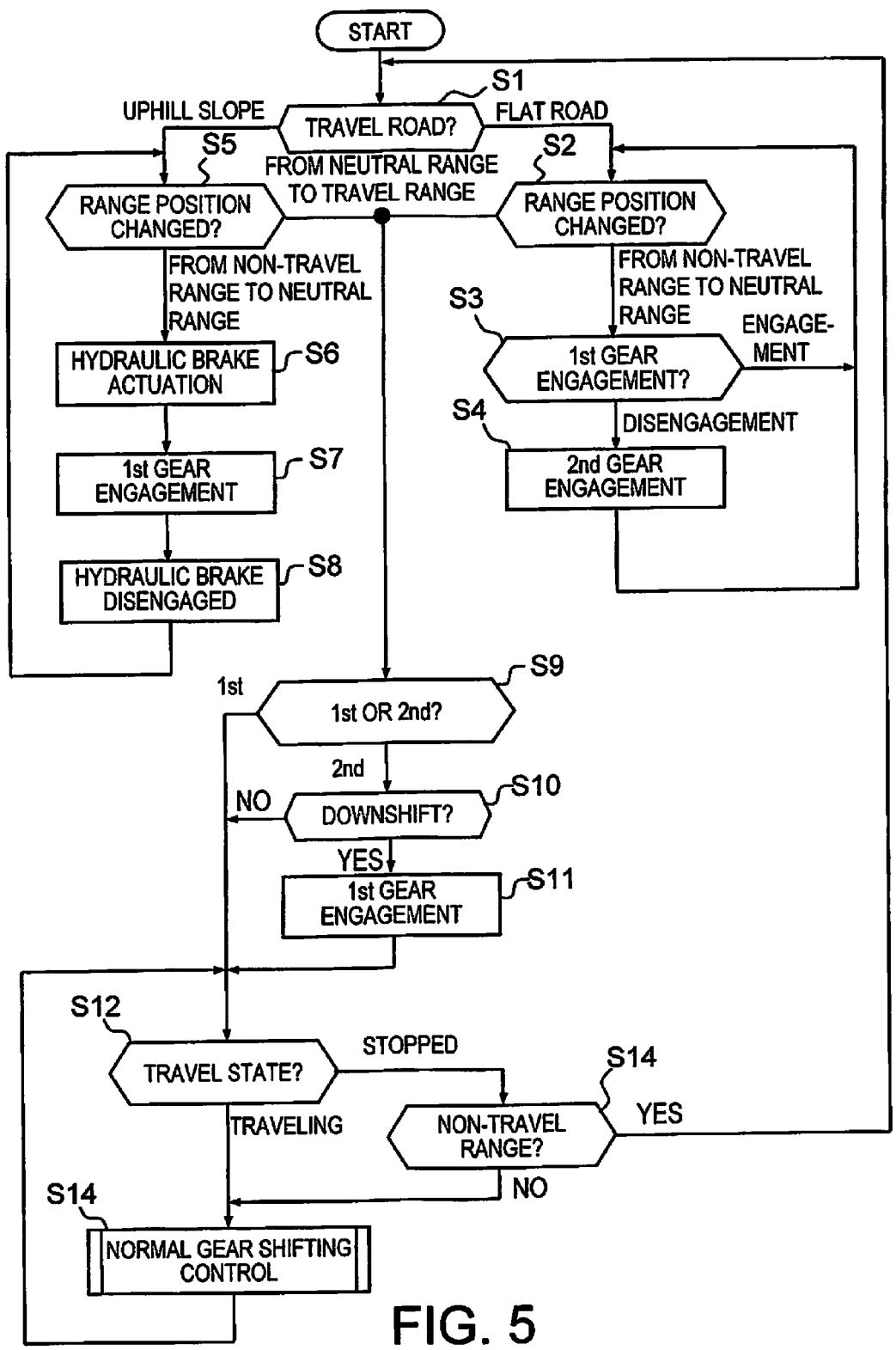
FIG. 5 is a flowchart of the gear shifting control process executed by the gear shifting controller of Embodiment 1.

FIG. 5 shows the flow of the gear shifting control process executed by the gear shifting controller 21 of Embodiment 1.

The steps representing the gear shifting control process configuration are described below with reference to FIG. 5. This process is started by the ignition switch being switched on with the non-travel range (P range) selected.

In step S1, the slope of the road surface to be traveled is estimated on the basis of the output of the longitudinal G sensor 25 when the vehicle is parked by selection of the non-travel range, and an assessment is made as to whether the estimated slope of the road surface is flat or an uphill slope. When an assessment has been made that the road surface is flat, the process proceeds to step S2, and when an assessment has been made that the road surface is an uphill slope, the process proceeds to step S5. At this point, the assessment as to whether the road surface is flat or an uphill gradient is made by setting a slope assessment threshold value in advance for determining a flat surface or uphill slope, and when the road surface slope estimation value is at or above the slope assessment threshold value, an assessment is made that the road surface is an uphill slope, and when the road surface slope estimation value is less than the slope assessment threshold value, an assessment is made that the road surface is flat.

In step S2, subsequent to assessment of a flat road in step S1, or first-gear engagement in step S3, or second-gear engagement in step S4, an assessment is made as to whether the range position (range location) has been modified. When a non-travel range has been changed to the neutral range, the process proceeds to step S3, and when the neutral range has been changed to a travel range, the process proceeds to step S9.

In step S3, subsequent to the assessment that the range position has been changed from the non-travel range to the neutral range in step S2, an assessment is made as to whether the coupling clutch (first-gear-engaging element) 8c can complete a meshed engagement operation responding to an engagement command. When an assessment has been made that the coupling clutch 8c (first-gear-engaging element) cannot complete the meshed engagement operation responding to an engagement command, the process proceeds to step S4, and when an assessment has been made that the coupling clutch 8c (first-gear-engaging element) can complete the meshed engagement operation responding to an engagement command, the coupling clutch 8c is placed in a state of meshed engagement and the process returns to step S2. At this point, when the time elapsed from the issuing of the engagement command to the coupling clutch 8c (first-gear-engaging element) has exceeded a target engagement time and the position detected by the sleeve position sensor 27 is not yet the target engagement completion position, an assessment is made that the coupling clutch 8c cannot complete the engagement operation responding to the engagement command. When the range position is changed to the neutral range, motor actuation is prohibited while the neutral range is selected so that the drive motor generator MG is not caused to generate torque even when an accelerator operation has occurred.

In step S4, subsequent to the assessment in step S3 that the coupling clutch 8c cannot engage, the friction clutch 9c (second-gear-engaging element) is engaged, and the process returns to step S2. At this point, when an assessment has been made that the coupling clutch 8c cannot engage and the coupling clutch 8c is in an intermediate position along the engagement stroke, the coupling clutch 8c is returned to the uncoupling position and the friction clutch 9c is thereafter engaged.

In step S5, an assessment is made as to whether the range position (range location) has been changed when an assessment has been made that the road surface is an uphill slope in step S1, or subsequent to the hydraulic brake being disengaged in step S8. The process proceeds to step S6 when the range position has been changed from a non-travel range to the neutral range, and the process proceeds to step S9 when the range position has been changed from the neutral range to a travel range.

In step S6, subsequent to the assessment that the range position has been changed from a non-travel range to the neutral range in step S5, the popup actuation for increasing the engagement force of the hydraulic brake 15 is started, and the process proceeds to step S7. At this point, the amount of increase in the brake engagement force in the popup actuation for increasing the engagement force of the hydraulic brake 15 is set so that the total engagement force of the engagement force increase and the brake engagement force by the braking operation is an engagement force required for holding position on a hill. When the range position has been changed to the neutral range, motor actuation is prohibited while the neutral range is selected so that the drive motor generator MG is not caused to generate torque even when an accelerator operation has occurred.

Subsequent to the start of actuation of the hydraulic brake 15 in step S6, in step S7, the coupling clutch 8c (first-gear-engaging element) meshes and engages, and the process proceeds to step S8.

Subsequent to the engagement of the coupling clutch 8c in step S7, when the engagement of the coupling clutch 8c has completed, the popup actuation for increasing the engagement force of the hydraulic brake 15 is stopped, and the process returns to step S5.

Subsequent to the range position having been changed from the neutral range to a travel range in step S2 or step S5, in step S9, an assessment is made as to whether the shift position selected by the automatic transmission 3 is the low gear stage (first gear) or high gear stage (second gear). When the shift position is a low gear stage (first gear), the process proceeds to step S12, and when the shift position is a high gear stage (second gear), the process proceeds to step S10.

Subsequent to the assessment that the shift position is the high gear stage (second gear) in step S9, an assessment is made in step S10 whether a downshift is possible. If YES (downshift is possible), the process proceeds to step S11, and if NO (downshift is not possible), the process proceeds to step S12.

Subsequent to the assessment that a downshift is possible in step S10, the friction clutch 9c (second-gear-engaging element) is disengaged, the coupling clutch 8c (first-gear-engaging element) is downshifted to the low gear stage by being repositioned for meshing and engaging, and the process proceeds to step S12.

Subsequent to the assessment that the gear position is the low gear stage (first position) in step S9, or the assessment that downshifting is not possible in step S10, or the downshift in step S11, or the normal gear shifting control in step S14; in step S12, an assessment is made as to whether the vehicle is in a travel state by selection of a travel range. When the vehicle is in a travel state, the process proceeds to step S14, and when the vehicle is in a stopped state, the process proceeds to step S13.

Subsequent to assessment that the vehicle is in a stopped state in step S12, in step S13, an assessment is made as to whether the selected range position is a non-travel range. If YES (non-travel range), the process returns to step S1, and if NO (other than a non-travel range), the process proceeds to step S14.

Subsequent to the assessment that the vehicle is in a travel state in step S12, or the assessment that the vehicle is in a range position other than a non-travel range in step S13, in step S14, normal gear shifting control is performed, normal gear shifting control being that which uses a gear shifting map dependent on the vehicle speed VSP and the requested motor torque. The process then returns to step S12.

The effects are next described. The effects in the gear shifting control device of the electric automobile of Embodiment 1 are described below under the headings: "Effect of normal gear shifting control," "Effect of gear shifting control during start-off in first gear on a flat road," and "Effect of gear shifting control during start-off in second gear on a flat road," and "Effect of gear shifting control during start-off in first gear on an uphill slope."

Effect of Normal Gear Shifting Control

The gear shifting controller 21 receives, as inputs, the vehicle speed VSP from the vehicle speed sensor 22, an accelerator position AP0 from the accelerator position sensor 23, and a brake stroke variable BST from the brake stroke sensor 24. Gear shifting control of the automatic transmission 3 is performed on the basis of this input information and the gear shifting map illustrated in FIG. 6, as described below.

Figure 6:
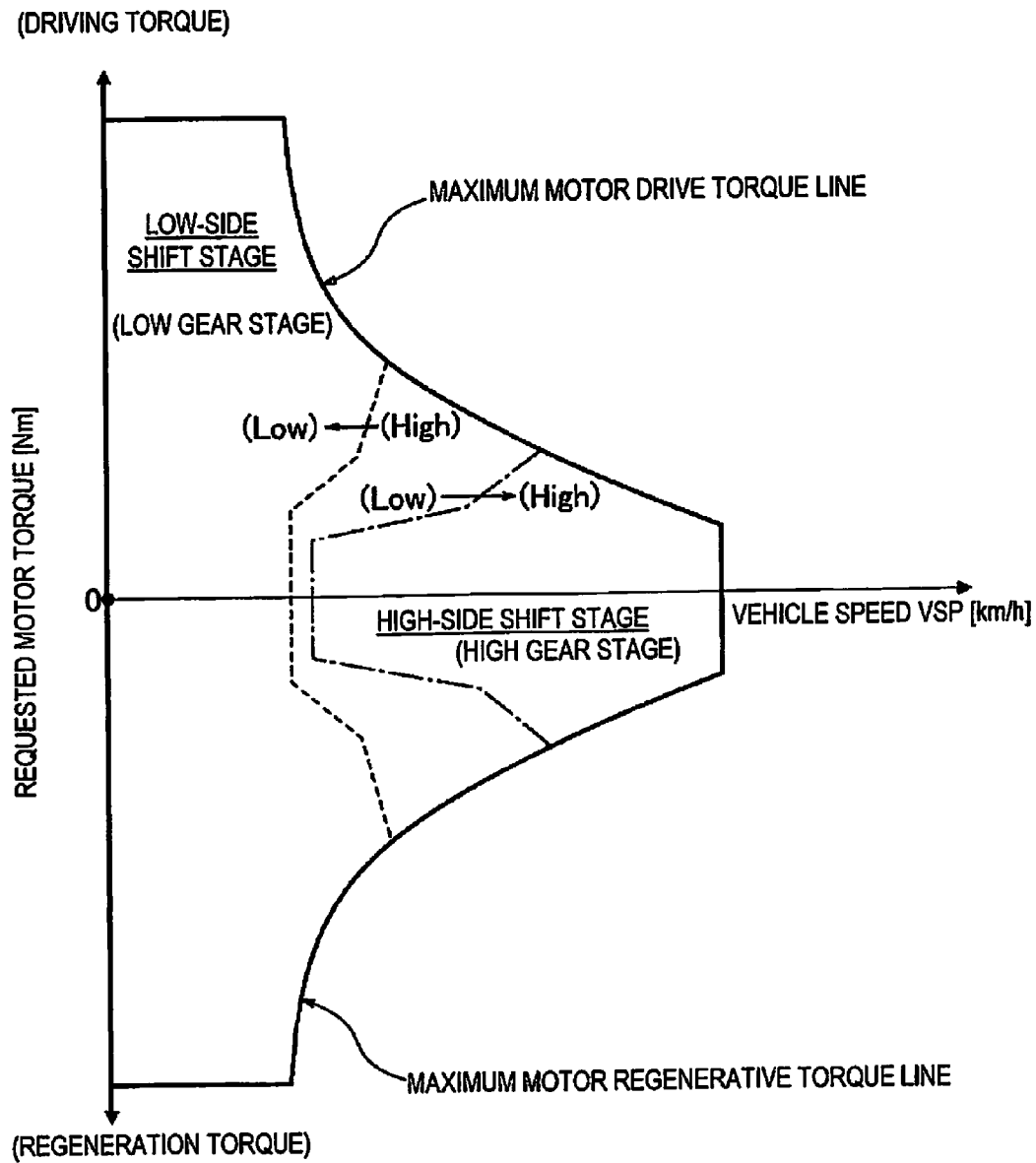
FIG. 6 is a gear shifting map of an example of the up-shift line and the downshift line of the automatic transmission in the gear shifting control device of Embodiment 1.

In the gear shifting map of FIG. 6, the solid bold lines are the maximum motor drive torque line obtained by plotting the maximum motor drive torque values of the drive motor generator MG for each vehicle speed VSP, and the maximum motor regenerative torque line obtained by plotting the maximum motor regenerative torque values of the drive motor generator MG for each vehicle speed VSP. The area enclosed by these lines is the usable area.

The up-shift line (Low to High) indicated by the dashed-dotted line and the downshift line (High to Low) indicated by the broken line are set in the usable area with consideration given to transmission loss of the automatic transmission 3 and the motor loss of the drive motor generator MG. The up-shift line (Low to High) is set to the higher vehicle speed side that the downshift line (High to Low) by an amount commensurate to hysteresis.

During drive travel in which the accelerator pedal is depressed, an operating point is determined in the gear shifting controller 21 by the vehicle speed VSP and the required motor drive torque obtained from the accelerator position AP0. On the other hand, during braking in which the brake pedal is being depressed, the operating point is determined by the vehicle speed VSP and the required motor regeneration torque obtained from the brake stroke variable BST. When the operating point is determined, an optimal target shift position (low gear stage or high gear stage) in the current operating state is obtained by whether the operating point is present in the low-side shift position area or whether the operating point is present in the high-side shift position area on the gear shifting map of FIG. 6.

Next, if the obtained target shift position is low gear, a state will be assumed in which the low gear stage is selected, where the coupling clutch 8c is set in a meshingly coupled state, and the friction clutch 9c is set in a disengaged state. If the target shift position thus obtained is high gear, a state will be assumed in which the high gear stage is selected, where the friction clutch 9c is set in a frictionally engaged state, and the coupling clutch 8c is set in an uncoupled state.

Furthermore, when the low gear stage has been selected and the operating point in the usable area passes through the up-shift line (Low to High) and enters the high-side shift position area, the target shift position switches to the high gear stage. When the high gear stage has been selected and the operating point in the usable area passes through the downshift line (High to Low) and enters the low-side shift position area, the target shift position switches to the low gear stage.

Here, in the flowchart shown in FIG. 5, a travel state in which the travel range has been selected is assumed, and when the flow that proceeds from step S12 to step S14 is repeated, normal gear shifting control is performed in step S14. When a transition is made to a stopped state from the travel state obtained by selection of a travel range, the flow that proceeds from step S12 to step S13 and then to step S14 is repeated, and normal gear shifting control is performed in step S14 as long as the range position is not changed to a non-travel range.

In normal gear shifting control, upshifting to cause the automatic transmission 3 to transition from a low gear stage to a high gear stage is performed by reengagement shifting in which the meshingly coupled coupling clutch 8c is uncoupled and the disengaged friction clutch 9c is frictionally engaged. Downshifting to cause the automatic transmission 3 to transition from a high gear stage to a low gear stage is performed by reengagement control in which the uncoupled coupling clutch 8c meshingly couples and the frictionally engaged friction clutch 9c is disengaged.

Effect of Gear Shifting Control During Start-Off in First Gear on a Flat Road

When the vehicle starts off from a stopped state on a flat road with a non-travel range selected, the range position passes from the non-travel range through the neutral range and switches to a travel range; the range position alternatively switches in a stepwise fashion from the non-travel range to the neutral range and then to the travel range. The gear shifting control effect during start-off in first gear on a flat road is described below with reference to the flowchart in FIG. 5 and the timing chart in FIG. 7.

When the range position has been switched to the neutral range with the intention of starting off from a stopped state on a flat road with a non-travel range selected, the flow progresses from step S1 to step S2 to step S3 in the flowchart of FIG. 5 provided that the conditions of engagement of the coupling clutch 8c (first-gear-engaging element) have been fulfilled. In other words, when an assessment has been made in step S3 that the coupling clutch 8c (first-gear-engaging element) can complete a meshed engagement operation responding to an engagement command, the coupling clutch 8c is set in a meshingly engaged state and the process returns to step S2. At this point, when the range position is changed from a non-travel range to the neutral range, motor actuation is prohibited while the neutral range is selected so that the drive motor generator MG is not caused to generate torque even when an accelerator operation has occurred.

When the range position has been changed from the neutral range to a travel range and the accelerator has been depressed, the process proceeds from step S2 to step S9 to step S12 and then to step S14 in the flowchart of FIG. 5. The flow from step S12 to step S14 is repeated as long as the travel state is maintained. At this point, when the range position is changed from the neutral range to a travel range, the prohibition of motor actuation is removed and the drive motor generator MG is caused to generate torque in accordance with the accelerator operation.

Figure 7:
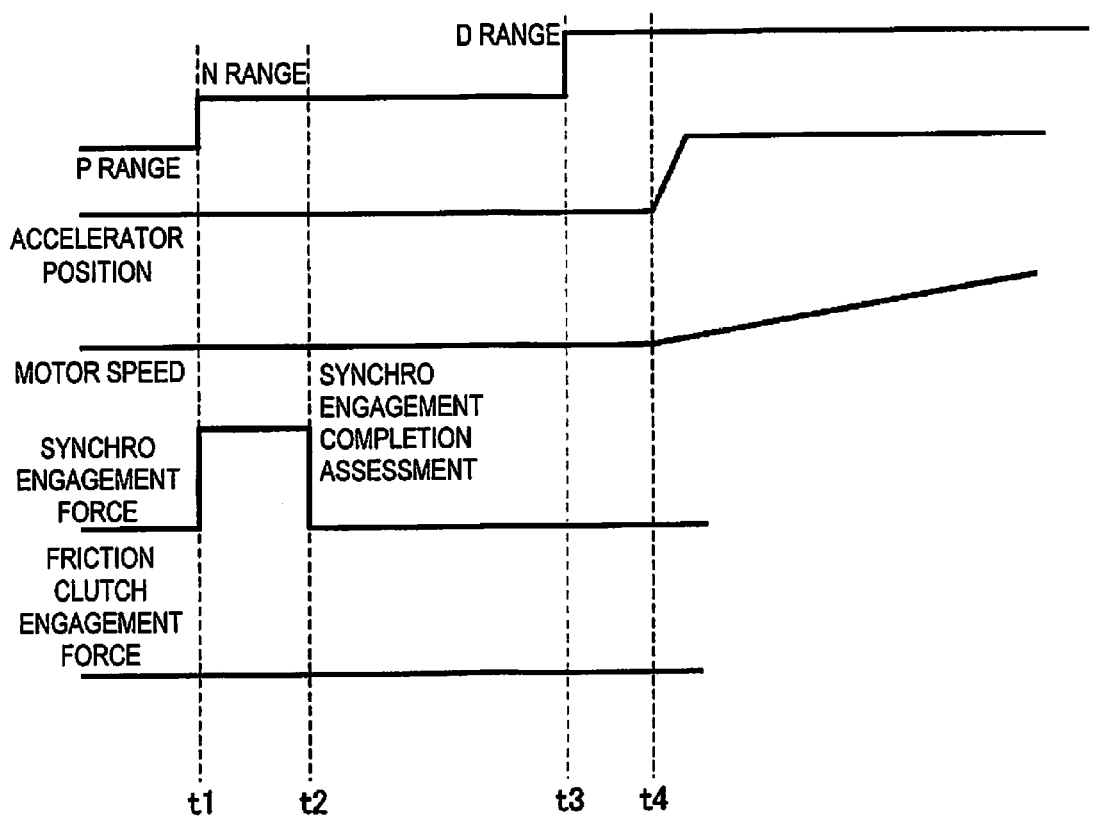
FIG. 7 is a timing chart showing the characteristics of the range position, accelerator position, motor speed, synchro (coupling clutch) engagement force, and clutch (friction clutch) engagement force during start-off in first gear on a flat road in an electric automobile in which the gear shifting control device of Embodiment 1 has been mounted.

The timing chart shown in FIG. 7 shows the gear shifting control effect during start-off in first gear on a flat road. In the timing chart, time t1 is the time at which a switch is made from P range (non-travel range) to N range (neutral range), time t2 is the synchro-engagement-completion assessment time, time t3 is the time at which a switch is made from N range to D range (travel range), and time t4 is the accelerator-depressing start time.

In other words, by having the meshed engagement of the coupling clutch 8c (first-gear-engaging element) be completed between the P-to-N switching time t1 and the synchro-engagement-completion assessment time t2, the automatic transmission 3 is placed on standby with the low gear stage (first-gear position) in which the coupling clutch 8c is engaged being selected. Accordingly, when the N-to-D switching time t3 elapses and an accelerator-depressing operation starts at time t4, the motor speed increases from time t4 in response to the accelerator-depressing operation.

As described above, in Embodiment 1, the neutral range of the automatic transmission 3 is configured as a range over which the drive motor generator MG is not caused to generate torque even when an accelerator-depressing operation has been performed, and when the neutral range is selected, the coupling clutch 8c for engaging in first gear is set in an engaged state.

In other words, the start-off response may be delayed when engagement of the coupling clutch 8c, which is the first-gear-engaging element, is started after a travel range has been selected. In response, when starting off with the travel range selected, it is possible to prepare for starting off in first gear by depressing the accelerator in the travel range by setting the coupling clutch 8c in an engaged state in advance in the neutral range, which has been passed through or selected prior to the travel range being selected. At this point, setting the neutral range of the automatic transmission 3 to be a range over which the drive motor generator MG is not caused to generate torque even when an accelerator-depressing operation has been performed allows the coupling clutch 8c to engage in the neutral range. As a result, it is possible to respond to a request for a rapid start-off when a selection operation is made from a neutral range to a travel range.

In Embodiment 1, a configuration is used in which the first-gear-engaging element of the automatic transmission 3 is set as the coupling clutch 8c for meshed engaging. In other words, when the first-gear-engaging element is configured as the coupling clutch 8c and a selection operation in which a transition from the neutral range to the travel range is performed, the time required from start of meshed engagement of the coupling clutch 8c to the end of meshed engagement is greater than with the friction clutch 9c. Consequently, when the engagement of the coupling clutch 8c is started after a travel range is selected, completion of engagement of the coupling clutch 8c must be awaited before starting, and the start-off response delay is increased. By contrast, rapid start-off response is ensured by setting the coupling clutch 8c in an engaged state in advance in the neutral range, even though the coupling clutch 8c, which has a longer required engagement time, is used as the first-gear-engaging element.

Effect of Gear Shifting Control During Start-Off in Second Gear on a Flat Road

When the vehicle starts from a stopped state on a flat road with a non-travel range selected, the range position passes from the non-travel range through the neutral range and switches to a travel range; the range position alternatively switches in a stepwise fashion from the non-travel range to the neutral range and then to the travel range. The gear shifting control effect during start-off in second gear on a flat road is described below with reference to the flowchart in FIG. 5 and the timing charts in FIGS. 8 and 9.

When the range position has been switched to the neutral range with the intention of starting off from a stopped state on a flat road with a non-travel range selected, the flow progresses from step S1 to step S2 to step S3 to step S4 in the flowchart of FIG. 5 when the conditions governing engagement of the coupling clutch 8c (first-gear-engaging element) are not fulfilled. In other words, when an assessment has been made in step S3 that the coupling clutch 8c (first-gear-engaging element) cannot complete a meshed engagement operation responding to an engagement command, the friction clutch 9c (second-gear-engaging element) is set in a frictional engaged state and the process returns to step S2. At this point, when the range position is changed from a non-travel range to the neutral range, motor actuation is prohibited while the neutral range is selected so that the drive motor generator MG is not caused to generate torque even when an accelerator operation has occurred.

When the range position has been changed from the neutral range to a travel range and the accelerator has been depressed, the process proceeds from step S2 to step S9 to step S10 and then to step S11 in the flowchart of FIG. 5. In other words, when an assessment has been made that a downshift is possible in step S10, a downshift to a low gear stage is executed in step S11 by reengagement control in which the friction clutch 9c (second-gear-engaging element) is disengaged and the coupling clutch 8c (first-gear-engaging element) meshes and engages.

The flow proceeds from step S12 to step S14, and as long as the travel state is maintained, the flow that proceeds from step S12 to step S14 is repeated. At this point, when the range position is changed from the neutral range to a travel range, the prohibited motor actuation is cancelled and the drive motor generator MG is caused to generate torque in accordance with the accelerator operation.

Figure 8:
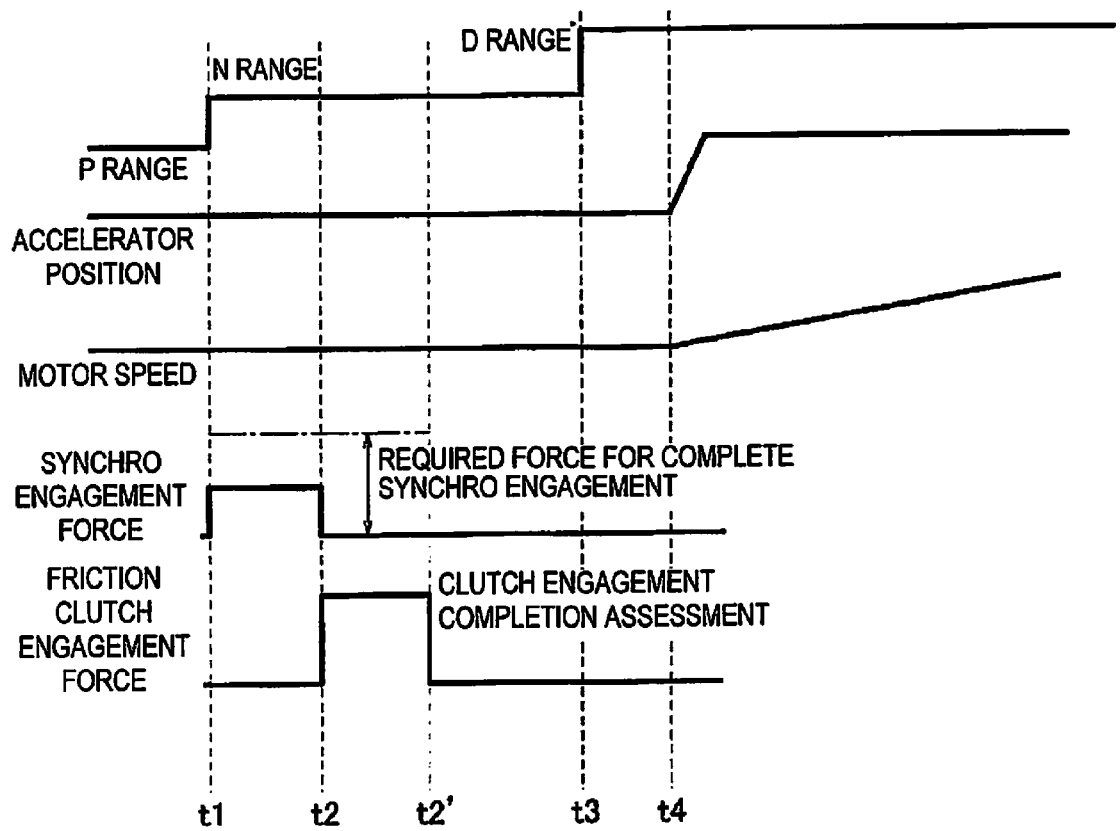
FIG. 8 A timing chart showing the characteristics of the range position, accelerator position, motor speed, synchro (coupling clutch) engagement force, and friction clutch engagement force during start-off in second gear on a flat road in an electric automobile in which the gear shifting control device of Embodiment 1 has been mounted.

The timing chart shown in FIG. 8 shows the gear shifting control effect during start-off in second gear on a flat road. In the timing chart, time t1 is the time at which a switch is made from P range (non-travel range) to N range (neutral range), time t2 is the impossible-synchro-engagement assessment time, time t2' is the friction clutch engagement-completion assessment time, time t3 is the time at which a switch is made from N range to D range (travel range), and time t4 is the accelerator-depressing start time.

In other words, the coupling clutch 8c (first-gear-engaging element) does not reach the force required for complete synchro engagement from P-to-N switching time t1 to impossible-synchro-engagement assessment time t2, and meshed engagement is not complete. In view of this fact, engagement of the friction clutch 9c (second-gear engaging element) is started in place of the coupling clutch 8c at time t2, and an assessment is made that the friction clutch 9c will complete engagement at friction clutch engagement-completion assessment time t2'. In other words, in the N range, the automatic transmission 3 is placed on standby with the high gear stage (second-gear position) selected in which the friction clutch 9c is engaged. Accordingly, when the N-to-D switching time t3 elapses and an accelerator-depressing operation starts at time t4, the motor speed increases from time t4 in response to the accelerator-depressing operation.

As described above, in Embodiment 1, a configuration is used in which the friction clutch 9c for engaging in second gear is set in an engaged state when an assessment has been made that the coupling clutch 8c cannot complete an engagement operation responding to an engagement command when the range position passes from the P range through the N range or when the N range is selected. In other words, in the case of the coupling clutch 8c, the coupling clutch 8c may not transition to a meshingly engaged state in certain meshing positions (e.g., the meshing distal end parts are mutually opposing and make contact). In contrast, when the coupling clutch 8c (first-gear-engaging element) cannot engage, starting off in first gear is abandoned, the friction clutch 9c for engaging in second-gear is engaged, and a second-gear start off is attempted, whereby a rapid start-off is made possible when start-off is achieved by selectively changing the range position from P range to N range to D range.

In Embodiment 1, the sleeve position sensor 27 for assessing completion of engagement by the coupling clutch 8c is provided, and a configuration is used in which an assessment is made that the coupling clutch 8c cannot complete an engagement operation responding to an engagement command when the elapsed time from the engagement command output to the coupling clutch 8c has exceeded a target engagement time (time t1 to t2) and the position detected by the sleeve position sensor 27 has not arrived at a target engagement completion position. In other words, assessment that engagement is possible or not possible by the coupling clutch 8c is made by using a target engagement time (time t1 to t2) determined in advance as the assessment waiting time and by whether the sleeve position at the elapsed waiting time has arrived at the engagement completion position. Therefore, assessment that the coupling clutch 8c (first-gear-engaging element) cannot complete engagement can be made precisely at an early stage without waiting for a long period of time and by confirming the sleeve position.

In Embodiment 1, a configuration is used in which the second-gear-engaging element of the automatic transmission 3 is the friction clutch 9c for frictional engagement. For example, when the first-gear-engaging element and the second-gear-engaging element are both coupling clutches, it is possible that engagement of the coupling clutch will be delayed or the coupling clutch will not be able to engage in a second-gear start were a second-gear start-off to be performed in place of a first-gear start-off. In contrast, using the friction clutch 9c as the second-gear engaging element makes it possible to achieve a rapid second-gear start-off because the friction clutch 9c frictionally engages with good response when an assessment is made that the coupling clutch 8c (first-gear-engaging element) cannot engage.

In Embodiment 1, a configuration is used in which the friction clutch 9c is set in an engaged state, a second-gear start-off is performed, and a downshift from second to first by disengaging the friction clutch 9c and engaging the coupling clutch 8c during second-gear travel.

Figure 9:
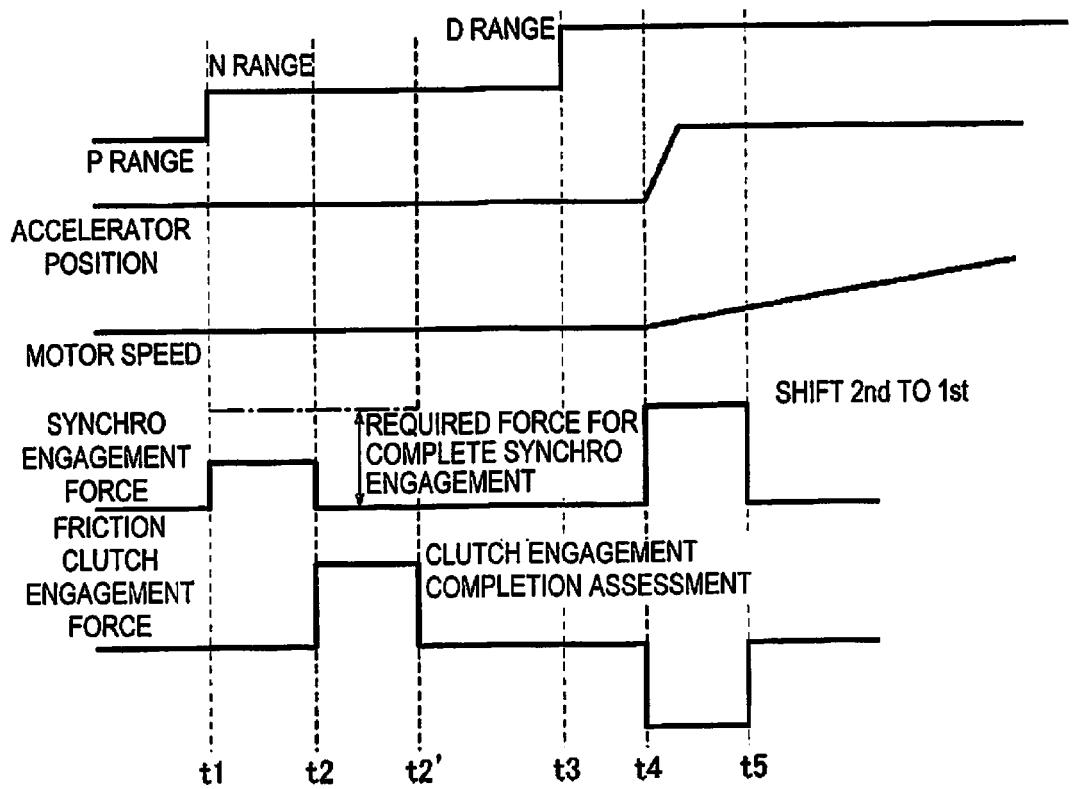
FIG. 9 is a timing chart showing the characteristics of the range position, accelerator position, motor speed, synchro (coupling clutch) engagement force, and friction clutch engagement force when downshifting from second gear to first gear after starting off in second gear on a flat road in an electric automobile in which the gear shifting control device of Embodiment 1 has been mounted.

The timing chart shown in FIG. 9 shows the gear shifting control effect during a downshift from second to first during start-off in second gear on a flat road. In the timing chart, times t1 to t3 are the same as in the timing chart shown in FIG. 8, time t4 is the accelerator-depressing start time as well as the second-to-first downshift start time, and time t5 is the second-to-first downshift end time. In other words, in the N range, the automatic transmission 3 is on standby due to a state in which high gear stage (second-gear position) is selected with the friction clutch 9c engaged, and when the N-to-D switching time t3 elapses and an accelerator-depressing operation is started at time t4, the motor speed increases from time t4. Additionally, a second-to-first downshift is performed in response to the accelerator-depressing operation at time t4. Therefore, during start-off in second gear on a flat road, a drive force (>high gear stage drive force) produced from the low gear stage (first-gear position) is ensured from time t5 after the accelerator-depressing operation.

Effect of Gear Shifting Control During Start-Off in First Gear on an Uphill Slope When the vehicle starts from a stopped state on an uphill slope with a non-travel range selected, the range position passes from the non-travel range through the neutral range and switches to a travel range; the range position alternatively switches in a stepwise fashion from the non-travel range to the neutral range and then to the travel range. The gear shifting control effect during start-off in first gear on an uphill slope is described below with reference to the flowchart in FIG. 5 and the timing chart in FIG. 10.

When the range position has been switched to the neutral range with the intention of starting off from a stopped state on an uphill slope with a non-travel range selected, the flow progresses from step S1 to step S5 to step S6 to step S7 and to step S8 in the flowchart of FIG. 5. In other words, in step S6, the popup actuation for increasing the engagement force of the hydraulic brake 15 is started, and in step S7, the coupling clutch 8c (first-gear-engaging element) meshed and engaged. When the engagement of the coupling clutch 8c is completed in step S8, the popup actuation for increasing the engagement force of the hydraulic brake 15 is cancelled. At this point, when the range position is changed from a non-travel range to the neutral range, motor actuation is prohibited while the neutral range is selected so that the drive motor generator MG is not caused to generate torque even when an accelerator operation has occurred.

When the range position has been changed from the neutral range to a travel range and the accelerator is depressed, the process proceeds from step S2 to step S9 to step S12 and then to step S14 in the flowchart of FIG. 5. The flow that proceeds from step S12 to step S14 is repeated as long as the travel state is maintained. At this point, when the range position is changed from the neutral range to a travel range, the prohibited motor actuation is cancelled and the drive motor generator MG is caused to generate torque in accordance with the accelerator operation.

Figure 10:
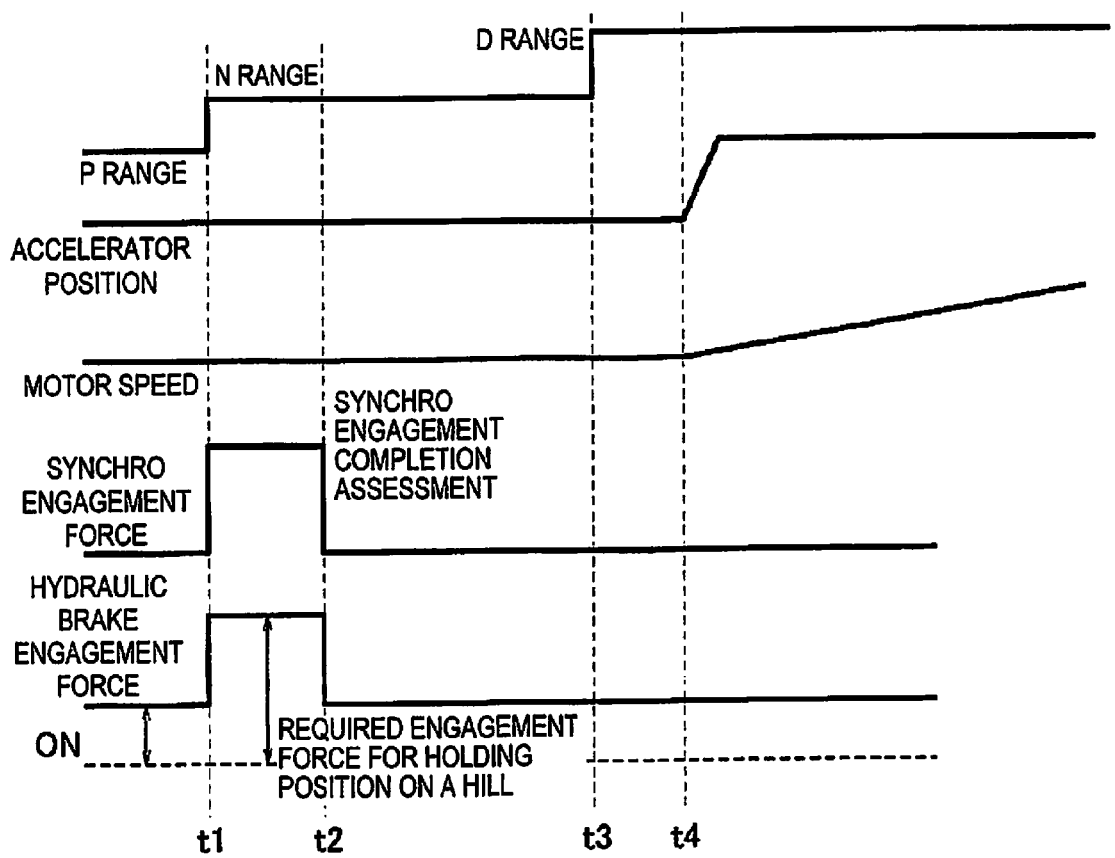
FIG. 10 is a timing chart showing the characteristics of the range position, accelerator position, motor speed, synchro (coupling clutch) engagement force, and hydraulic brake engagement force during start-off in first gear on an uphill road in an electric automobile in which the gear shifting control device of Embodiment 1 has been mounted.

The timing chart shown in FIG. 10 shows the gear shifting control effect during start-off in first gear on an uphill slope. In the timing chart, time t1 is the time at which a switch is made from P range (non-travel range) to N range (neutral range), time t2 is the synchro-engagement-completion assessment time, time t3 is the time at which a switch is made from N range to D range (travel range), and time t4 is the accelerator-depressing start time.

In other words, the coupling clutch 8c (first-gear-engaging element) arrives at the force required for complete synchro engagement from the P-to-N switching time t1 to the synchro-engagement-completion assessment time t2, and meshed engagement is complete. In synchronization with the time t1 to time t2 interval, the popup actuation for increasing the engagement force of the hydraulic brake 15 is performed, and the total engagement force of the engagement force increase amount and the brake engagement force (ON) by brake operation is an engagement force required for holding position on a hill.

As described above, a configuration is used in Embodiment 1 in which the engagement force of the hydraulic brake 15 for imparting braking force to the drive wheels 14 is increased when the range position is selected from the P range to the N range on an uphill slope. For example, when the range position passes from the P range through the N range on an uphill slope, or when a selection transitioning from the P range to the N range is made, the drive motor generator MG and the drive wheels 14 are uncoupled, and the vehicle will drift down the uphill slope. Also, a rotation differential is generated in the input side and the output side of the coupling clutch 8c due to the rotation caused by the downward drift of the drive wheels 14, and there is a greater possibility that the coupling clutch 8c will not be able to meshingly engage. In response, a brake engagement force required for holding position on a hill is imparted in synchronization with the change in range position from the P range to the N range on an uphill slope until the coupling clutch 8c completes engagement. As a result, the vehicle is prevented from drifting down an uphill slope and a rotation differential generated in the input side and the output side of the coupling clutch 8c for meshed engagement is eliminated when the N range is selected from the P range.

Effects are next described. The effects listed below can be obtained in the gear shifting control device for an electric automobile of Embodiment 1.

(1) A device for changing gear in an electric vehicle (electric automobile), comprising: an electric motor (drive motor generator MG) provided as a drive source; a stepped transmission (automatic transmission 3) provided in a drivetrain extending from the electric motor to a drive wheel 14, the stepped transmission having a park range (non-travel range, P range), a neutral range (N range), and a travel range (D range) as selectable range positions; and gear shifting control means (gear shifting controller 21) for controlling gear changing in the stepped transmission (automatic transmission 3); the gear shifting control means (gear shifting controller 21) sets the neutral range of the stepped transmission (automatic transmission 3) to a range over which the electric motor (drive motor generator MG) is not caused to generate torque even when an accelerator-depressing operation has been performed, and, when the neutral range has been selected, places a first-gear-engaging element (coupling clutch 8c) in an engaged state, the first-gear-engaging element engaging in first gear (FIG. 5). Accordingly, it is possible to respond to a request for a rapid start-off when a selection operation transitioning from a neutral range (N range) to a travel range (D range) is made.

(2) The meshingly engaging coupling clutch is set as the first-gear-engaging element in the stepped transmission (automatic transmission 3) (FIG. 3). Accordingly, in addition to the effects of (1), a rapid start-off response can be ensured by setting the coupling clutch 8c in an engaged state in the neutral range in advance, even though the coupling clutch 8c, which has a longer required engagement time, is used as the first-gear-engaging element.

(3) The gear shifting control means (gear shifting controller 21) causes a second-gear engaging element (friction clutch 9c) that engages in second gear to be placed in an engaged state upon an assessment having been made that an engagement action responding to an engagement command cannot be completed by the first-gear-engaging element (coupling clutch 8c) when a transition from the park range through the neutral range is to be made, or when a selection transitioning to the neutral range from the park range is made (FIG. 4). Accordingly, in addition to the effects of (1) or (2), a rapid start can be carried out using a second-gear start when the first-gear-engaging element (coupling clutch 8c) cannot be engaged.

(4) A position sensor (sleeve position sensor 27) for assessing that engagement of the first-gear-engaging element (coupling clutch 8c) is complete is provided; the gear shifting control means (gear shifting controller 21) assessing that an engagement operation responding to an engagement command cannot be completed by the first-gear-engaging element (coupling clutch 8c) in the event that the time elapsed from the issuing of the engagement command to the first-gear-engaging element (coupling clutch 8c) has exceeded a target engagement time and the position detected by the position sensor (sleeve position sensor 27) is not yet a target engagement completion position (S3 to S4 in FIG. 5). Accordingly, in addition to the effects of (3), assessment that the first-gear-engaging element (coupling clutch 8c) cannot complete engagement can be made with good precision at an early stage without waiting for a long period of time and by confirming the sleeve position.

(5) A frictionally engaging friction clutch 9c is set as the second-gear engaging element in the stepped transmission (automatic transmission 3) (FIG. 4). Accordingly, in addition to the effects of (3) and (4), a rapid second-gear start-off can be made by frictionally engaging the friction clutch 9c with good response when an assessment has been made that the coupling clutch 8c (first-gear-engaging element) cannot engage.

(6) After placing the second-gear engaging element in an engaged state, the gear shifting control means (gear shifting controller 21) performs a start-off in second gear, and shifts down to first gear by disengaging the second-gear engaging element (friction clutch 9c) during second-gear travel and engaging the first-gear-engaging element (coupling clutch 8c) (S9 to S10 to S11 in FIG. 5). Accordingly, in addition to the effects of (3) to (5), downshifting from second to first in a start-off area via an accelerator-depressing operation during start-off in second gear on a flat road makes it possible to ensure a high drive force using a first-gear step.

(7) The gear shifting control means (gear shifting controller 21) increases the force by which a hydraulic brake 15 for imparting braking force to the drive wheels 14 is engaged when a transition is made from the park range through the neutral range on an uphill slope, or when a selection transitioning to the neutral range from the park range is made on an uphill slope (S5 to S6 to S7 to S8 in FIG. 5). Accordingly, in addition to the effects of (1) to (6), the vehicle is prevented from drifting downward and a rotation differential between the input side and the output side of the first-gear-engaging element (coupling clutch 8c) is not generated when the range position is changed from the park range to the neutral range on an uphill slope.

The device for changing gear in an electric vehicle of the present invention was described above on the basis of Embodiment 1, but the specific configuration is not limited to Embodiment 1. Design modifications, additions, and the like can be made as long as there is no departure from the spirit of the invention according to the claims.

Embodiment 1 describes the stepped transmission using an example of the automatic transmission 3 having the coupling clutch 8c and the friction clutch 9c with two speed shift positions of a high gear stage and a low gear stage. However, an automatic transmission having three or more speed shift positions is also an example of a stepped transmission.

Embodiment 1 describes the first-gear-engaging element using an example of the coupling clutch 8c for meshed engaging. However, a friction clutch or friction brake may be used as the first-gear-engaging element in place of the coupling clutch.

Embodiment 1 describes an example in which the gear shifting control device of the present invention is applied to an electric vehicle provided with a drive motor generator as a drive source. However, the gear shifting control device of the present invention may also be applied to a series-type hybrid vehicle provided with an electric motor as a drive source, or to a parallel-type hybrid vehicle in which the electric vehicle travel mode is selected at start time, or to a plug-in hybrid vehicle or other electric vehicle.

The invention claimed is:
1. An electric vehicle gearshift control device for changing gear in an electric vehicle comprising:
   an electric motor provided as a drive source;
   a stepped transmission provided in a drivetrain extending from the electric motor to a drive wheel, the stepped transmission having a park range, a neutral range and a travel range as selectable range positions; and a gear shifting controller programmed to control gear changing in the stepped transmission, the gear shifting controller being programmed to set the neutral range of the stepped transmission to a range over which the electric motor is not caused to generate torque even when an accelerator-depressing operation has been performed, and places a first-gear-engaging element in an engaged state to engage a first gear when the neutral range has been selected.

2. The electric vehicle gearshift control device according to claim 1, wherein the first-gear-engaging element is a coupling clutch that is meshingly engaged in the stepped transmission.

3. The electric vehicle gearshift control device according to claim 1, wherein the gear shifting controller is programmed to cause a second-gear engaging element that engages in a second gear to be placed in an engaged state upon an assessment having been made that an engagement action responding to an engagement command cannot be completed by the first-gear-engaging element when a transition from the park range through the neutral range is to be made, or when a selection transitioning to the neutral range from the park range is made.

4. The electric vehicle gearshift control device according to claim 3, further comprising a position sensor configured to assess that engagement of the first-gear-engaging element is complete;

the gear shifting controller is programmed to assess that an engagement operation responding to an engagement command cannot be completed by the first-gear-engaging element in an event that a time elapsed from the issuing of the engagement command to the first-gear-engaging element has exceeded a target engagement time and a position detected by the position sensor is not yet a target engagement completion position.

5. The electric vehicle gearshift control device according to claim 3, further comprising the second-gear engaging element is a friction clutch that is frictionally engaged in the stepped transmission.

6. The electric vehicle gearshift control device according to claim 3, wherein the gear shifting controller is programmed to perform a start-off in the second gear, after placing the second-gear engaging element in an engaged state and shift down to the first gear by disengaging the second-gear engaging element during second-gear travel and engaging the first-gear-engaging element.

7. The electric vehicle gearshift control device according to claim 1, wherein the gear shifting controller is programmed to increase a force by which a hydraulic brake for imparting braking force to the drive wheel is engaged when a transition is made from the park range through the neutral range on an uphill slope, or when a selection transitioning to the neutral range from the park range is made on an uphill slope.

8. The electric vehicle gearshift control device according to claim 2, wherein the gear shifting controller is programmed to cause a second-gear engaging element that engages in a second gear to be placed in an engaged state upon an assessment having been made that an engagement action responding to an engagement command cannot be completed by the first-gear-engaging element when a transition from the park range through the neutral range is to be made, or when a selection transitioning to the neutral range from the park range is made.

9. The electric vehicle gearshift control device according to claim 8, further comprising a position sensor configured to assess that engagement of the first-gear-engaging element is complete;

the gear shifting controller is programmed to assess that an engagement operation responding to an engagement command cannot be completed by the first-gear-engaging element in an event that a time elapsed from the issuing of the engagement command to the first-gear-engaging element has exceeded a target engagement time and a position detected by the position sensor is not yet a target engagement completion position.

10. The electric vehicle gearshift control device according to claim 8, further comprising the second-gear engaging element is a friction clutch that is frictionally engaged in the stepped transmission.

11. The electric vehicle gearshift control device according to claim 8, wherein the gear shifting controller is programmed to perform a start-off in the second gear, after placing the second-gear engaging element in an engaged state-and shift down to the first gear by disengaging the second-gear engaging element during second-gear travel and engaging the first-gear-engaging element.

12. The electric vehicle gearshift control device according to claim 2, wherein the gear shifting controller is programmed to increase a force by which a hydraulic brake for imparting braking force to the drive wheel is engaged when a transition is made from the park range through the neutral range on an uphill slope, or when a selection transitioning to the neutral range from the park range is made on an uphill slope.

13. The electric vehicle gearshift control device according to claim 3, wherein the gear shifting controller is programmed to increase a force by which a hydraulic brake for imparting braking force to the drive wheel is engaged when a transition is made from the park range through the neutral range on an uphill slope, or when a selection transitioning to the neutral range from the park range is made on an uphill slope.

14. The electric vehicle gearshift control device according to claim 9, wherein the gear shifting controller is programmed to increase a force by which a hydraulic brake for imparting braking force to the drive wheel is engaged when a transition is made from the park range through the neutral range on an uphill slope, or when a selection transitioning to the neutral range from the park range is made on an uphill slope.

\* \* \* \* \*